United States Patent
Engel et al.

(10) Patent No.: US 11,358,471 B2
(45) Date of Patent: Jun. 14, 2022

(54) ELECTRICAL VEHICLE SYSTEM

(71) Applicant: Dr. Ing. h.c. F. Porsche Aktiengesellschaft, Stuttgart (DE)

(72) Inventors: Joseph A. Engel, Differdange (LU); Scott Gerber, Kokomo, IN (US); Alexandre M Reis, Kokomo, IN (US)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 215 days.

(21) Appl. No.: 16/234,796

(22) Filed: Dec. 28, 2018

(65) Prior Publication Data

US 2020/0207209 A1 Jul. 2, 2020

(51) Int. Cl.
*B60L 1/04* (2006.01)
*B60L 53/20* (2019.01)
*H02J 7/00* (2006.01)
*H05B 1/02* (2006.01)
*B60R 16/033* (2006.01)
*H02J 7/34* (2006.01)

(52) U.S. Cl.
CPC ............ *B60L 1/04* (2013.01); *B60L 53/20* (2019.02); *B60R 16/033* (2013.01); *H02J 7/0068* (2013.01); *H05B 1/0236* (2013.01); *B60L 2210/10* (2013.01); *H02J 7/345* (2013.01)

(58) Field of Classification Search
CPC ........ B60L 1/04; B60L 53/20; B60L 2210/10; H05B 1/0236; H02J 7/0068; H02J 7/345; B60R 16/033
See application file for complete search history.

(56) References Cited

U.S. PATENT DOCUMENTS

| | | | |
|---|---|---|---|
| 6,072,301 A | 6/2000 | Ashtiani et al. | |
| 8,049,460 B2 * | 11/2011 | Krauer | B60L 58/27 320/104 |
| 8,497,031 B2 | 7/2013 | Reischmann et al. | |
| 9,238,415 B2 * | 1/2016 | King | H02J 7/0042 |
| 9,969,273 B2 * | 5/2018 | Rozman | B60L 58/18 |
| 2005/0151517 A1 * | 7/2005 | Cook | B60R 16/03 323/207 |
| 2009/0021221 A1 * | 1/2009 | Krauer | B60L 1/08 320/153 |
| 2009/0139781 A1 | 6/2009 | Straubel | |
| 2009/0315518 A1 * | 12/2009 | Soma | B60K 6/445 320/134 |
| 2011/0241581 A1 | 10/2011 | Flock et al. | |
| 2011/0267004 A1 | 11/2011 | Krauer et al. | |

(Continued)

FOREIGN PATENT DOCUMENTS

| | | |
|---|---|---|
| DE | 102014218775 A1 | 3/2016 |
| FR | 3036864 A1 | 12/2016 |
| WO | 2014024708 A1 | 2/2014 |

*Primary Examiner* — Jared Fureman
*Assistant Examiner* — Michael J Warmflash
(74) *Attorney, Agent, or Firm* — Leydig, Voit & Mayer, Ltd.

(57) ABSTRACT

An electrically powered vehicle system includes a DC/DC converter stage with a rectified input terminal which receives a rectified input from an AC power input. The system also includes a vehicle battery which receives power output from the DC/DC converter stage, via a first link between the rectified input terminal and the DC/DC converter stage. A second link is connected to the first link and to a vehicle device.

9 Claims, 2 Drawing Sheets

(56) References Cited

U.S. PATENT DOCUMENTS

| | | | | |
|---|---|---|---|---|
| 2012/0049794 | A1* | 3/2012 | Han | B60L 53/14 |
| | | | | 320/109 |
| 2012/0112547 | A1* | 5/2012 | Ghosh | H02J 9/062 |
| | | | | 307/66 |
| 2014/0329113 | A1* | 11/2014 | Han | B60L 50/40 |
| | | | | 429/7 |
| 2015/0137751 | A1* | 5/2015 | King | B60L 50/51 |
| | | | | 320/109 |
| 2015/0336522 | A1* | 11/2015 | Cook | H02M 7/44 |
| | | | | 307/29 |
| 2018/0334045 | A1* | 11/2018 | Bendani | B60L 58/20 |

* cited by examiner

ELECTRICAL VEHICLE SYSTEM

TECHNICAL FIELD

This invention relates to electric vehicles and has particular application to circuitry which provides power to heaters and other vehicle components/devices/systems.

BACKGROUND OF THE INVENTION

Typically, electrically powered vehicles include a battery of a nominally fixed voltage. Such batteries may be nominally of different standard voltage levels 12V or 24V for example. The batteries need to be charged usually from AC mains supply. The AC mains supply is filtered and rectified, passed through a DC/DC filter to provide the appropriate voltage, and typically filtered before charging the battery.

Typically, such vehicles include a heater which needs to heat e.g. batteries from cold start or a capacitor bank/bulk capacitance. Such a heater or other vehicle devices are powered via the battery through power drivers and other stages which are complex in design and relatively costly. Furthermore, the circuitry has high volume and weight.

It is an object of the invention to provide improved circuitry with lower complexity and cost. It is an object of the invention to provide improved flexibility in power supply to e.g. heaters and other devices and stability with minimal components.

SUMMARY OF THE INVENTION

In one aspect is provided an electrically powered vehicle system including a DC/DC converter stage, including a rectified input terminal adapted to receive a rectified input from an AC power input, including a vehicle battery adapted to receive power output from said DC/DC converter stage, via a first link between said rectified input terminal and said DC/DC converter stage, and including a further second link, connected to said first link, said second link connected to a vehicle device.

The system may be adapted such that power can be provided via said first and second links from either the rectified input, or the vehicle battery via the DC/DC converter stage.

Said second link may connect said first link to said vehicle device is via at least one further stage.

Said vehicle component may be a heater.

The system may include a capacitor bank, said capacitor bank connected to said first link.

The said capacitor bank may be connected to said vehicle device or said at least one further stage.

The system may be adapted so as to supply power from said capacitor bank to said vehicle component.

Said at least one further stage is a bi-directional transformer or a buck boost circuit.

Said heater may be a battery heater or capacitor bank heater.

Said DC/DC converter stage may be bi-directional such that it is adapted to allow power to flow form said rectified input terminal to said battery and also to flow form said battery to said vehicle device via said links.

The system may include a filter stage located between said vehicle battery and said DC/DC converter stage.

The term "link" can be interpreted as an electrical connection.

BRIEF DESCRIPTION OF THE DRAWINGS

The present invention is now described by way of example with reference to the accompanying drawings in which.

DESCRIPTION OF THE PREFERRED EMBODIMENTS

Prior Art

Figure 1:
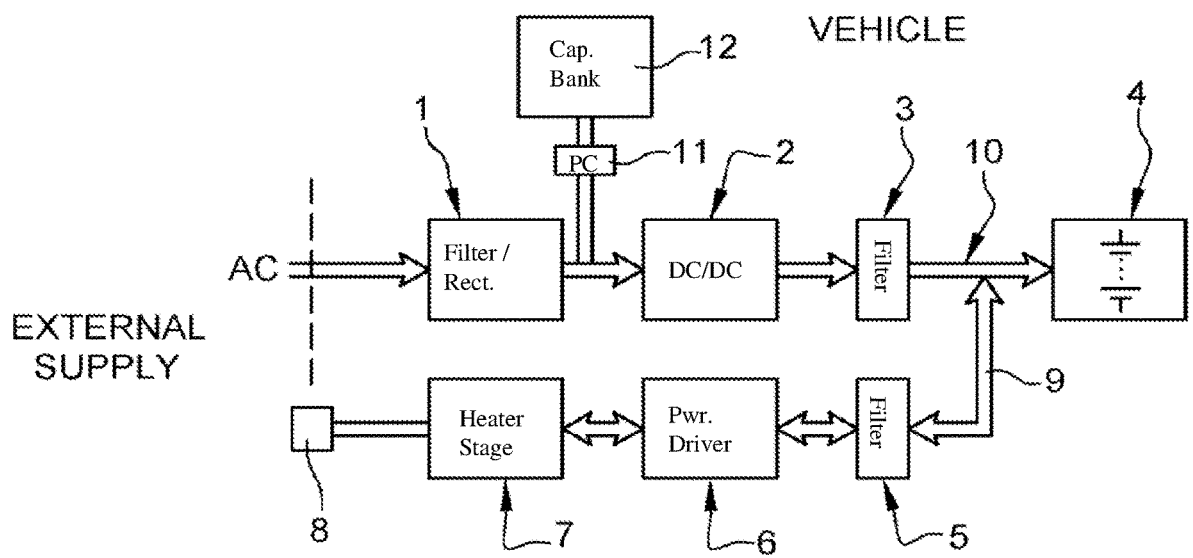
FIGS. 1 and 2 show prior art electrical vehicle systems.

FIG. 1 shows a current circuit arrangement where power is supplied from an AC grid supply (external supply) shown on the left to charge a vehicle battery 4. The AC supply is passed through a filtering and rectification stage 1, into a net that is connected to a capacitor bank (bulk capacitor) 12 and is also fed to a DC/DC (converter) stage 2. This stage provides adjustment of the voltage output therefrom to the voltage of the battery 4. The output of the DC/DC converter stage 2 is to an optional filter 3 and then to the vehicle battery 4 via cables 10. It is to be noted in the following examples and including examples of the invention, the rectification stage 1 may be outside the vehicle and part of the charging station.

A heater for the battery or other system is typically powered via the battery. For this purpose there is provided a link 9 from the battery (and/or the output from filter 3) to a filter 5 and then to a first power driver stage 6. Power from first power driver stage 6 is then fed to stage 7 which may be regarded as part of the actual heater device and provides calorific heat to a heating system 8 for the batteries. The filters 3 and 5 may be common. Stage 7 and heating system 8 may be considered as a single block together providing heating functionality. First power driver stage 6 provides conditioning and dimming functionality for the battery e.g. to reduce the voltage peaks (e.g. in a ripple). In some cases there may be different battery voltage options so the first power driver stage 6 also needs to account for this.

Typically, electrical vehicles have a high capacity capacitor bank 12. The capacitors can also be charged via the mains via a net. Effectively there is a junction where filtered and rectified voltage from rectification stage 1 is provide to both the DC/DC converter stage 2 as well as capacitor bank 12 via a pre-charger/conditioner 11 which provides slow ramp up of the capacitor bank 12 to e.g. minimize losses.

Figure 2:
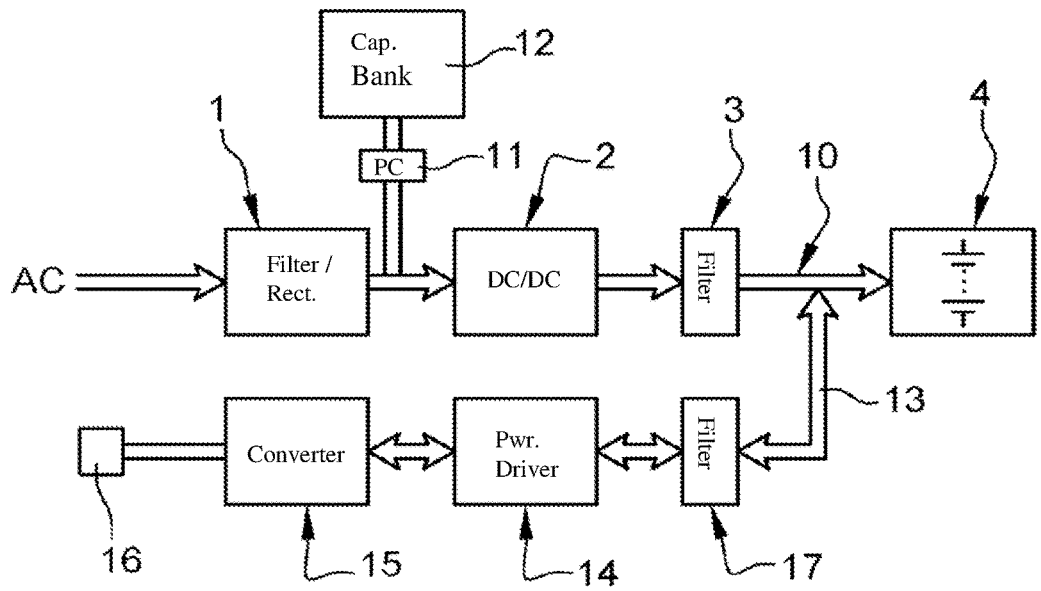

FIG. 2 also shows another prior art system which is similar to FIG. 1 and identical reference numerals refer to the same components. A link 13 is provided from the battery or the output from filter 3 and is fed to a further filter 17. The output from this is then to a first DC/DC converter stage 14 and then to a second converter stage 15 and provides voltage to the system/device 16. Either or both of first DC/DC converter stage 14 and second converter stage 15 may include an isolation stage. First DC/DC converter stage 14 and second converter stage 15 are shown in series but could also be in parallel or could be regarded as a single multi-functional block. The reason for the two stages is for dynamic reasons. This is a penalty for cost, weight, volume and efficiency. First DC/DC converter stage 14 and second converter stage 15 as well as filter 17 include complex and bulky circuitry. Again at least one of these stages may need to provide conditioning and dimming functionality for the battery e.g. to reduce the voltage peaks (e.g. in a ripple). In some cases there may be different battery voltage options so these stage(s) may also need to account for this.

Invention

Figure 3:
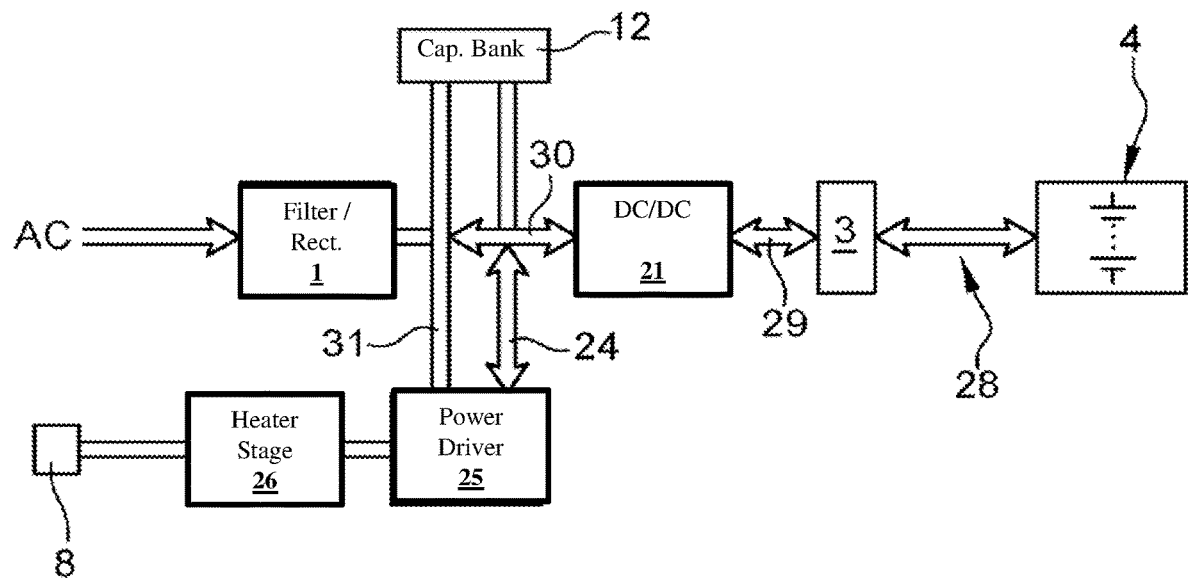
FIGS. 3 and 4 show electrical vehicle systems according to examples of the invention.

FIG. 3 shows an example of the invention. This circuitry can replace the circuitry of FIG. 1.

Again, power is taken from an AC grid supply and to a filtering and rectification stage 1, into a net/connections such that the output is to a capacitor bank 12. The output of rectification stage 1 is fed into a DC/DC converter stage 21, which may be the same as DC/DC converter stage 2 in FIG. 1; the output of which is supplied to a vehicle battery 4 optionally via optional filter module 3. The DC/DC converter stage 21 adjusts the voltage from rectification stage 1 to the voltage of the battery as before. Cables/connections 28 are located between the filter 3 and battery 4 providing the connection to the battery 4. In addition is provided a link 29 between the filter module 3 and DC/DC converter stage 21; both links 28 and 29 are bi-directional.

A link 30 provides a connection between the output of the rectification stage 1 and the input side of the DC/DC converter stage 21, as well as the output of rectification stage 1 and the capacitor bank 12.

A further link 24 is provided which may be part of a general net/junction and connected to link/connection 30, connects the output of the rectification stage 1 as well as the input side of the DC/DC converter stage 21 (e.g. via link 30) to a power driver stage 25 for heater stage 26 and other components of a heating system 8. Again, heater stage 26 and heating system 8 may be regarded as a single heating system.

The heater stage 26 can be a simplified version of stage 7 in the prior art. The simplification is in how power driver stage 25 and heater stage 26 are designed since the DC/DC converter stage 21 is common to the charger path (1, 21, 3) and to the heater path (adjusts the voltage level and reduces the dynamic range expected at the power driver stage 25).

The power driver stage 25 can thus receive input/power from either the AC supply or the input side of the DC/DC converter stage 21 from the battery 4. The power driver stage 25 feeds power to the heater 7. There is also an optional direct link (connection) 31 between the capacitor bank 12 and power driver stage 25.

The above circuitry means that the heater can be provided with power from the battery or the output of the rectification stage 1 directly. Furthermore, power driver stage 25 can be provided by relatively simple circuitry replacing the filter 5 and first power driver stage 6 of FIG. 1. The circuitry of power driver stage 25 essentially can be basic switching and provide optional safety function.

The DC/DC converter stage 21 is common to the charger path (1, 21, 3) and to the heater path (21, 24, 25, 26, 8) and provides requisite adjustments for the voltage level and reduces the dynamic range expected at the power driver stage 25.

The space savings, weight savings, and cost savings are main attributes to this solution. Depending on functional safety aspects, the control of the stages can be common or separate, for EMC reasons, the control frequencies can be in sync or not.

Figure 4:
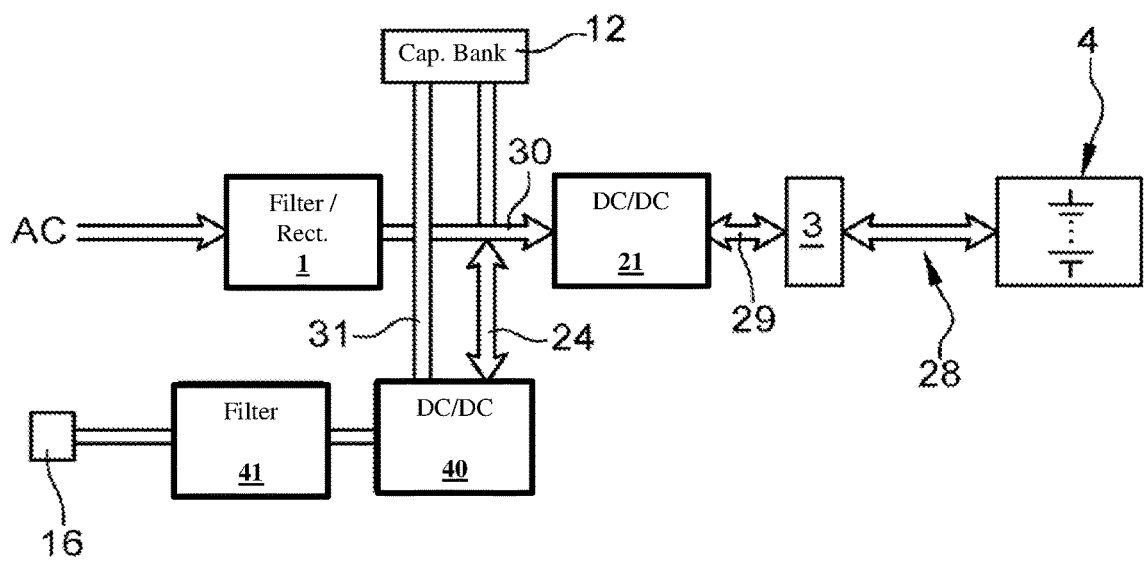

FIG. 4 shows a further example of circuitry according to one aspect. Again, this circuitry can replace the circuitry of FIG. 2. The circuitry is similar to FIG. 3 and like reference numerals refer to the same component.

Again, power is taken from an AC grid supply and to a filtering and rectification stage 1, into a net 30 that includes a capacitor bank 12 (so the output of rectification stage 1 is fed into capacitor bank 12. The output of rectification stage 1 is fed into a DC/DC converter stage 21, the output of which is supplied to a vehicle battery 4 optionally via optional filter module 3. The DC/DC converter stage 21 adjusts the voltage from rectification stage 1 to the voltage of the battery 4 as before. Cables/connections 28 are located between the filter module 3 and battery 4 providing the connection to the battery 4. In addition, a link 29 is provided between the filter module 3 and DC/DC converter stage 21; both links 28 and 29 are bi-directional.

A link 30 provides a connection between the output of the rectification stage 1 and the nominal input side of the DC/DC converter stage 21, and as well as the output of rectification stage 1 and the capacitor bank 12.

A further link 24 is provided which connects the output of the rectification stage 1 as well as optionally the nominal input side of the DC/DC converter stage 21, e.g. via link 30, this time to a DC/DC converter stage 40. The output of DC/DC converter stage 40 is then sent to an optional filter 41 before supplying output to a vehicles component/device 16.

There is also an optional direct link (connection) 31 between the capacitor bank 12 and DC/DC converter stage 40.

Again, the bi-directional links 28, 29, 30 means power to the component/device 42 can be provided from the battery via DC/DC converter stage 21 as well as form the output of rectification stage 1 (from the AC supply).

DC/DC converter stage 40 and filter 41 are provided in such arrangement such that the DC/DC converter stage 21 common to the charger path (1, 21, 3) and to the converter path (3, 21, 24, 40, 41) and these stages adjust the voltage level and reduces the dynamic range expected at the DC/DC converter stage 40. The functional block of DC/DC converter stage 40 may also include the switches that manage the capacitor bank 12 on the link 24. This enables creation of a fast voltage rise needed for example at start of vehicle and a control charging operation needed for operating modes where the additional capacitors 12 are required.

The space savings, weight savings and cost savings are main attributes to this solution. Depending on functional safety aspects, the control of the stages can be common or separate, for EMC reasons, the control frequencies can be in sync or not.

The DC/DC converter stage 40 can either be a bi-directional transformer or a galvanically coupled Buck Boost circuit. It can either be uni-polar or bi-polar with a center point. This can evolve to create a redundant output stage without changing the basics of the idea.

We claim:

1. An electrically powered vehicle system, the system comprising:
   a DC/DC converter stage adapted to bi-directionally convert between a first DC voltage at an input side and a second DC voltage at an output side;
   a first link connected to the input side of the DC/DC converter stage, the first link being adapted to provide a rectified AC input from an AC power input to the input side of the DC/DC converter stage;
   a vehicle battery adapted to receive DC power output from and to output DC power to the output side of the DC/DC converter stage;
   a second link adapted to connect the first link to a vehicle device, the second link being adapted to allow DC power received from the rectified AC input via the first link to flow to the vehicle device;

a filter and rectifier connected to the first link, the filter and rectifier adapted to receive the AC power input, and rectify and filter the AC power input to provide the rectified AC input to the first link, the rectified AC input being at the first voltage; and a capacitor bank, the capacitor bank being directly connected to the filter and rectifier and the DC/DC converter, the capacitor bank being configured to receive the rectified AC input, wherein the DC/DC converter stage is adapted to allow the DC power received from the rectified AC input to flow to the vehicle battery, and to allow the DC power received from the vehicle battery to flow to the vehicle device via the first link and the second link, wherein the vehicle device is a heater, the heater comprising an input stage which is a power driver or another DC/DC converter, wherein the first link directly connects together the filter and rectifier, the DC/DC converter stage, and the input stage of the heater, and wherein the capacitor bank is directly connected to the input stage of the heater to provide DC power to the input stage of the heater.

2. The system as claimed in claim 1, wherein the second link connects the first link to the vehicle device via at least one further stage.

3. The system as claimed in claim 2, wherein the at least one further stage is a bidirectional transformer or a buck boost circuit.

4. The system as claimed in claim 1, where the heater is a battery heater or a capacitor bank heater.

5. The system as claimed in claim 1, the system comprising a filter stage connected between the vehicle battery and the DC/DC converter stage.

6. The system as claimed in claim 2, wherein the at least one further stage is a second DC/DC converter stage.

7. The system as claimed in claim 2, wherein the at least one further stage is a second DC/DC converter stage including switches which manage the capacitor bank.

8. The system as claimed in claim 1, the system comprising a rectification stage comprising the filter and rectifier, wherein the rectified AC input is provided by the rectification stage such that the first link directly connects the rectification stage to the DC/DC converter stage.

9. The system as claimed in claim 8, wherein the first link does not include an electronic power storing device in series between the rectification stage and the DC/DC converter stage.

* * * * *